Aug. 11, 1925.  1,549,180
W. J. BRUNE
DEMOUNTABLE TIRE RIM
Filed Aug. 26, 1924
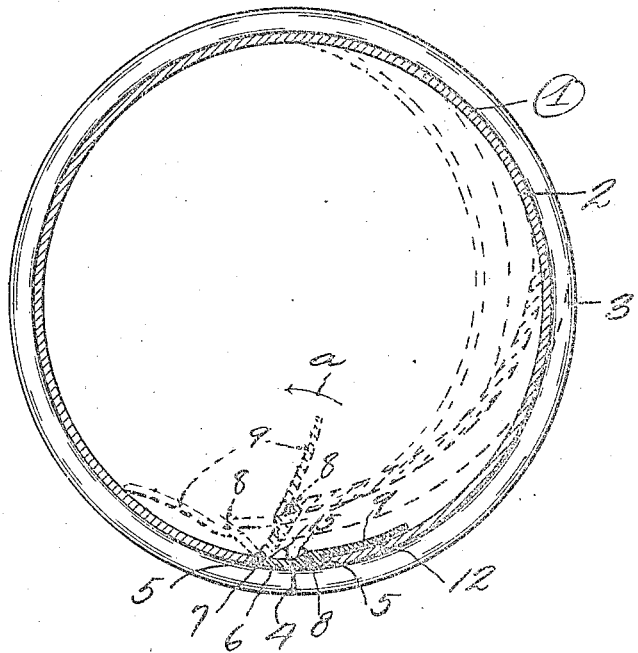
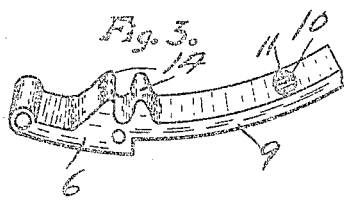
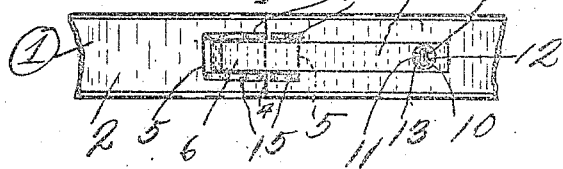
INVENTOR.
W. J. Brune
BY
Philip A. H. Sewell
ATTORNEY.

Patented Aug. 11, 1925.

1,549,180

UNITED STATES PATENT OFFICE.

WILL J. BRUNE, OF TEKAMAH, NEBRASKA.

DEMOUNTABLE TIRE RIM.

Application filed August 26, 1924. Serial No. 734,190.

*To all whom it may concern:*

Be it known that WILL J. BRUNE, a citizen of the United States, residing at Tekamah, in the county of Burt and State of Nebraska, has invented certain new and useful Improvements in Demountable Tire Rims, of which the following is a specification, reference being had therein to the accompanying drawings.

The invention relates to demountable rims of the type used in connection with pneumatic automobile tires, and has for its object to provide a device of this character of the split rim type wherein the adjacent abutting ends of the rim have their main body provided with registering recesses, in which recesses is pivotally mounted at points spaced from its ends, a lever which lever is relatively wide in relation to the main body of the rim, and when the rim is expanded is in circumferential alinement with the main body of the rim, thereby obviating a bulky inwardly extending member.

A further object is to provide the lever with a curved handle at one end of substantially the same radius as the rim and adapted to closely engage the inner side of one end of the rim when the rim is expanded, and to receive in an aperture therein a rotatable locking bolt which cooperates with shoulders within the aperture of the handle member for holding the handle member in closed position, said handle member forming means adapted to be grasped for moving the adjacent ends of the rim out of abutting registration and contracting the rim upon a pivotal movement of the lever, said lever when in extreme open position being held open by the outward spring action of the rim.

A further object is to provide the adjacent ends of the rim and the lever with registering spaced lugs, between which lugs a member carried by a felly is received for preventing circumferential movement of the rim on the felly of a wheel.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical longitudinal sectional view through the rim.

Figure 2 is a side elevation of the connecting lever and handle member.

Figure 3 is a perspective view of the lever and handle member showing spaced lugs thereon.

Figure 4 is a plan view of the inner side of the adjacent ends of the rim.

Referring to the drawing the numeral 1 designates a demountable rim, which rim comprises the annular substantially flat body member 2 having flanges 3 adapted to grip and hold the clincher flanges of an automobile tire. The rim 1 is split as at 4, and has its ends normally in abutting engagement as clearly shown in Figure 1, when the rim is in use on a tire and wheel felly. The adjacent ends of the body member 2 are provided with recesses 5, in which recesses is disposed a lever 6, which is of substantially the same thickness as the body member 2, and disposed in the same circumferential arc as the body member 2, thereby preventing extension, inwardly and outwardly, beyond the lines of the inner and outer periphery of the body member 2. Lever 6 is pivotally connected at 7 in the recess 5 at a point spaced from the outer end of the recess 5 and at 8 at a point spaced from the outer end of the other recess 5. One end of the lever 6 adjacent the pivotal point 8 is provided with an arcuate handle 9, which is relatively thin and curved at substantially the same arc as the inner periphery of the body member 2, and positioned whereby when the lever 6 is in the position shown in Figure 1, it will closely engage the inner periphery of the rim and receive in the aperture 10 thereof the head 11 of a rotatable bolt 12, which bolt when rotated to a position where its head 11 will be transversely disposed will engage over the shoulders 13 of the aperture 10 and securely hold said handle member and the lever in extended position as shown in Figure 1, thereby rigidly holding the demountable rim in rigid position. When it is desired to contract the rim the operator grasps the handle member 9 and moves the same in the direction of the arrow *a* to the dotted line positions shown in Figure 1, which action will move the abutting ends of the rim out of engagement and to the dotted line positions shown in Figure 1, thereby contracting the rim, and allowing a tire to be removed therefrom. The rim is held in contracted position also by the spring action of the rim when the lever is in extreme open position.

The lever 6 is provided with spaced lugs 14, which lugs register with spaced lugs 15 carried by the inner periphery of the body member 2 of the rim at opposite sides of the recess 5, and which lugs receive therebetween, when disposed on a wheel felly a securing bolt or lug, which will prevent circumferential movement of the rim on the felly. The lugs 15 are preferably stamped from the body of the rim during the formation of the same thereby forming integral lugs and obviating the use of rivets. It is to be understood that the lugs 14 or 15 may be eliminated if so desired.

From the above it will be seen that means is provided in connection with a demountable rim whereby said rim may be easily and quickly contracted, and the abutting ends thereof moved into and out of engagement with each other. It will also be seen that the lever is pivoted within recesses in the body 2 of the rim, thereby obviating the placing of fingers on the opposite sides of a lever which is a common difficulty with devices of this character wherein the lever forms a rim section pivoted to adjacent ends of the split rim. It will also be seen that the device is compact in form and positive in its operation.

The invention having been set forth what is claimed as new and useful is:—

1. The combination with adjacent abutting ends of a split rim having recesses in the main body thereof registering with each other, of a lever disposed entirely within said recesses, said lever having its opposite ends pivotally mounted in the recesses at points spaced from each other, a curved handle member carried by one end of the lever and engaging the inner side of one end of the rim, a rotatable locking bolt carried by one end of the rim and extending into an aperture in said handle member, a head carried by said locking bolt and cooperating with shoulders in the aperture of the handle member, spaced lugs carried by the lever, spaced lugs carried by the ends of the rim and registering with the lugs carried by the lever, said spaced lugs being adapted to receive therebetween a member carried by a felly.

2. The combination with the adjacent ends of a split demountable rim, said rim comprising a flat annular body member, tire receiving flanges carried by the opposite sides of the body member, a curved lever in the plane of the body member and having its ends pivotally connected in the inner ends of recesses carried by the body member, an inwardly offset curved handle carried by one end of the lever, said handle member engaging the inner side of the body member, locking means carried by the body member and cooperating with the handle and spaced registering lugs carried by the inner side of the body member adjacent their ends and registering with spaced lugs carried by the inner side of the lever.

In testimony whereof I hereunto affix my signature.

WILL J. BRUNE.